Figure 1:
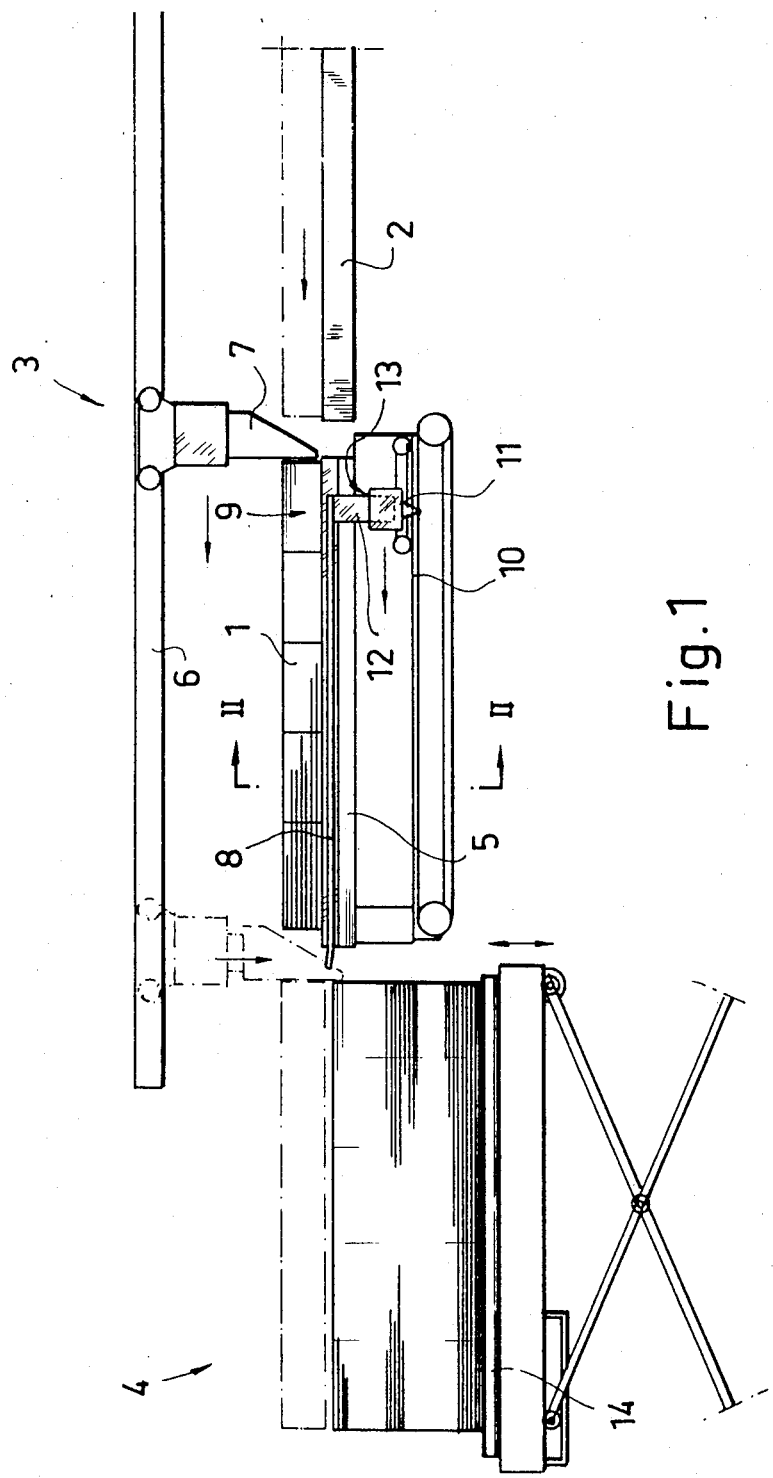

United States Patent [19]

Jaatinen

[11] Patent Number: 4,815,924
[45] Date of Patent: Mar. 28, 1989

[54] SHEET STACKING MEANS AFTER A CROSS-CUTTING SAW

[75] Inventor: Per A. Jaatinen, Helsinki, Finland

[73] Assignee: Oy Raumatic AB, Nastola, Finland

[21] Appl. No.: 37,311

[22] Filed: Apr. 13, 1987

[30] Foreign Application Priority Data

Apr. 11, 1986 [FI] Finland ............................ 861543

[51] Int. Cl.⁴ .............................................. B65G 57/06
[52] U.S. Cl. ...................... 414/794.3; 414/82;
 414/89; 414/793.3; 414/794.7; 83/90; 83/93
[58] Field of Search ............. 414/82, 85, 89; 83/91,
 83/90, 86, 84, 93; 271/189

[56] References Cited

U.S. PATENT DOCUMENTS

| | | | |
|---|---|---|---|
| 3,054,516 | 9/1962 | Joa ........................................ | 414/82 |
| 3,901,391 | 8/1975 | Carlson et al. ....................... | 414/85 |
| 4,195,959 | 4/1980 | Schmitt ................................ | 414/85 |
| 4,302,140 | 11/1981 | Donnelly et al. .................... | 414/46 |

FOREIGN PATENT DOCUMENTS 0129661 10/1979 Japan .................................. 414/85

Primary Examiner—Frank T. Yost
Assistant Examiner—Eugenia A. Jones
Attorney, Agent, or Firm—Browdy & Neimark

[57] ABSTRACT

A stacking device for sheets, such as chipboard, plywood or equivalent sheets after a cross-cutting saw, in which cut-off sheet packages are fed and stacked, after being sawn, onto the lifting table of a stacking station into stacks of a predetermined size. The stacking device comprises a feed means which moves the sheets from the entering transport track onto the lifting table of the stacking station. The feed means is provided with an intermediate table known in itself in the art, upon which sheet packages are fed with the aid of a pusher means travelling thereabove along a fixed track, and furthermore, from the intermediate table onto the lifting table of the stacking station with the same pusher means, and that the intermediate table is provided with spacer strips paralleling the direction of the sheet package, conveyed prior to transport from the intermediate table onto the lifting table of the stacking station, or on top of a stack thereon, which strips after the displacement may be pulled back to the intermediate table for the transport of the next sheet package.

5 Claims, 2 Drawing Sheets

SHEET STACKING MEANS AFTER A CROSS-CUTTING SAW

The present invention concerns a sheet stacking means of chipboard, plywood or equivalent sheets after a cross-scutting saw, in which means cut-off sheet packages are fed and stacked, after being sawn, on a lifting table of a stacking station in stacks of a pre-determined size, and said stacking means comprising a feed means which displaces the sheets from the entering transport track onto the lifting table of the stacking station.

In a cross-cutting saw, sheets, such as plywood and chipboard sheets, are usually cut off, in order to achieve a greater capacity, with several sheets superimposed one on another, that is, usually in packages of 50 to 200 mm height. After the cutting, the sheet package holds together, and the task is now to stack said sheet packages one exactly on top of the other on a table therebeside, most often on a lifting table.

It is usual that said stacking takes place, on layer of sheets at a time, with vacuum suction cups. This is rather successful if the sheets are dense and coated, although it is true that this kind of stacking frequently is slow and impedes the functioning. If a sheet to be stacked is an ordinary chipboard sheet or equivalent, a serious drawback related to the vacuum suction cup stack system arises in that the sheets transmit so much air that two or several sheets adhere here and there to one another. A condition for proper functioning of the suction cups is also that a suction cup must not strike on a hole between two sheets because this generates time-consuming displacement of suction cups when the cutting programme is frequently changed.

The object of the present invention is to eliminate the above drawbacks and to produce a new kind of stacking means for cross-cut sheets, with which means all kinds and sizes of sheets—also coated sheets and sheets with a vulnerable surface—can be stacked. The stacking means of the invention is characterized in that the feed means is provided with an intermediate table known in itself in the art, on which sheet packages are fed with the aid of a pusher means conveyed thereabove along a fixed track, and further from the intermediate table to the lifting table of the stacking station with the aid of the same pusher means, and that the intermediate table is provided with spacer strips paralleling the direction of the sheet stack, said strips being conveyed before the transport of the sheet package from the intermediate table to the lifting table of the stacking station, or on top of the sheet thereon, which strips after the transport operation can be pulled back to the intermediate table for moving the next sheet package. With the aid of the invention, the transport of a sheet package to the lifting table of the stacking station is accomplished by pushing the entire package in one operation from the intermediate table on one side of the lifting table onto the stack.

An advantageous embodiment of the invention is characterized in that the intermediate table is provided with grooves parelleling the direction of displacement, in which the spacer strips are so positioned that they are slightly below the plane of the intermediate table. Before the package is displaced from the intermediate table onto the stack, the spacer strips are pushed on top of the stack on the lifting table, and left between the stack and the package as the package is conveyed onto the stack.

The actual setting of a sheet package onto a stack takes place when spacer strips are pulled back into the grooves of the intermediate table at the same time as a comb-like stop, lowered earlier at the stacking edge and moving in intercalation with reference to the spacer strips, prevents the package from moving backwards. The sheet package is in this way placed accurately onto the stack which is on the lifting table, and it increases the stack height with the height of one package. The lowered comb-like stop may be separate although the most advantageus embodiment is considered to be such that it has been combined to the pusher means of the sheet package.

Another advantageous embodiment of the invention is characterized in that the support strips are at their ends fixed to a strip carriage passing along a fixed track below the intermediate table.

A third advantageous embodiment of the invention is characterized in that the fixing of the support strips consist of a downwards directed tongue which fits in a groove of the same shape in the strip carriage. The support strips may therefore be replaced rapidly and easily if they wear out, or if they have to be replaced with those of another type because of the material of sheet stacks. If the width of a sheet package changes, the number of strips may also be increased or decreased easily so that their number only corresponds to the width of the package.

The invention is described in the following with the aid of an example, reference being made to the drawings attached in which FIG. 1 presents a stacking means in elevational view.

Figure 2:
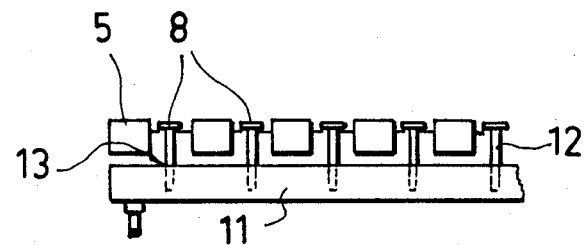

FIG. 2 presents a section along the line II—II as in FIG. 1.

Figure 3:
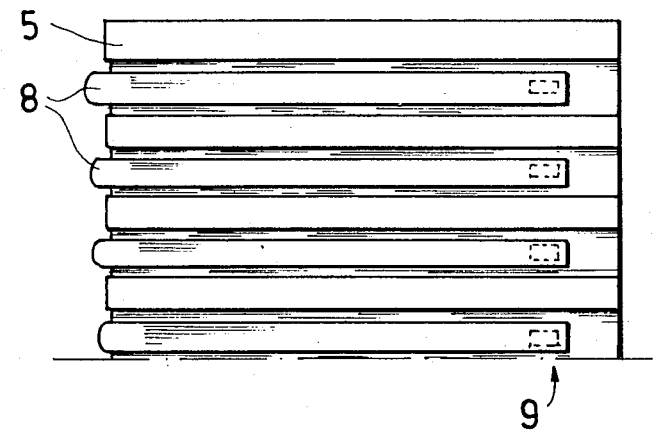

FIG. 3 presents an intermediate table in top view.

Sheet packages 1 are displaced from a sawing table 2 with the aid of a feed means 3 onto a lifting table of a stacking station 4, said table being movable in vertical direction. The feed means 3 is provided with an intermediate table 5 to which sheet packages 1 are fed with the aid of a pusher means 7 travelling thereabove along a fixed track 6. The sheet packages 1 are displaced from the intermediate table 5 onto the lifting table of the stacking station 4 with the same pusher means 7. The intermediate table 5 is provided with spacer strips 8 paralleling the displacement direction of the sheet package 1, conveyed prior to the transport from the intermediate table 5 to the lifting table of the stacking station 4, which strips 8 remain between the stack and the package when the displacement is carried out, and which thereafter can be pulled back to the intermediate table for the displacement of the next sheet package. The spacer strips 8 have at their ends 9 been attached to a strip carriage 11 travelling under the intermediate table 5 along a fixed track 10. The fixing of the spacer strips 8 consists of a downwards directed tongue 12 which fits in a groove 13 of the same shape in the strip carriage 11. The spacer strips 8 are thin plastic strips or coated flat bars, which prior to the displacement of a sheet package are conveyed upon parallel transport rolls 14 of the lifting table of the stacking station 4, or upon a stack placed thereupon. The intermediate table 5 consists of plastic coated square tubes parelleling the transport direction, between which the spacer strips 8 travel freely. When a sheet package enters in front of the pusher means 7, the pusher means 7 pushes the sheet package 1 onto the intermediate table 5, whereafter the pusher means 7 stops and the strip carriage 11 pushes the spacer strips 8 from beneath the sheet package 1 on the intermediate table 5 to the lifting table 4, whereafter the pusher means 7 pushes the sheet package 1 onto the spacer strips 8 on the stack. When the pusher means 7 has stopped, after its first movement during such operation a pusher (dash and dot lines), which is comb-like at the lower end, descends somewhat downwards, in intercalation with the strips 8, and serves as a stop when the spacer strips 8 are pulled back to after each completed cycle, the intermediate table 5. The lifting table of the stacking station 4 is lowered, and the next sheet package may be displaced onto the stack. Stacking is continued until the stack is complete. Thereafter, the completed stack is transported away from the lifting table, e.g. to partial stack and packing lines.

It is obvious to a person skilled in the art that the invention is not limited to the examples presented in the foregoing, and it may vary within the scope of the claims following below. Therefore, the fixing of spacer strips 8 need not necessarily consist of downwards directed tongues, quite the contrary, so that the rear ends of the strips 8 may be provided with holes which fit in corresponding pegs in the strip carriage 11.

I claim:

1. A sheet stacking means for stacking chipboard, plywood or equivalent sheets after a cut-off saw, by which a series of sheet packages are fed and stacked, after being sawn, into stacks of predetermined size on a lifting table of a stacking station, said stacking means comprising a feed means for moving a sheet package from an entering transport track onto the lifting table of the stacking station, said feed means being provided with an intermediate table having an upper surface defining a plurality of elongated grooves, pusher means travelling along a fixed track mounted above said intermediate table and for feeding said sheet package to said intermediate table and then from the intermediate table onto the lifting table of the stacking station, and spacer strips parelleling the direction of movement of the sheet package and in a first position resting in the elongated slots of said intermediate table, and means for conveying said spacer strips prior to transport of said sheet package from said first position on the intermediate table to a second position on the lifting table of the stacking station, or onto a stack thereon, and for pulling back said spacer strips after the transport of said sheet package back to said first position on the intermediate table.

2. Stacking means according to claim 1, wherein the spacer strips are so placed in the grooves of the intermediate table that they are slightly below the upper surface of the intermediate table.

3. Stacking means according to claim 1, wherein the spacer strips are at their ends fixed on a strip carriage moving below the intermediate table along a fixed track.

4. Stacking means according to claim 3, wherein the fixing of the spacer strips is carried out with a downwards directed tongue which fits in a groove of the same shape in the strip carriage.

5. Stacking means according to claim 1, wherein the pusher means consists of a comb-like rail which, when it has pushed a sheet package onto the stack, stops and descends slightly to be in intercalation with the spacer strips, thus stopping the return of both the sheet package and the sheets under the spacer strips back to the intermediate table when the spacer strips are returned to the intermediate table.

* * * * *